United States Patent
Ota (10) Patent No.: US 10,768,868 B2
(45) Date of Patent: Sep. 8, 2020

(54) SYSTEM AND METHOD FOR PERFORMING FAULT DIAGNOSIS ON A DEVICE (71) Applicant: CANON KABUSHIKI KAISHA, Tokyo (JP)

(72) Inventor: Shunsuke Ota, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/460,495

(22) Filed: Jul. 2, 2019

(65) Prior Publication Data
US 2020/0012457 A1 Jan. 9, 2020

(30) Foreign Application Priority Data
Jul. 9, 2018 (JP) .................................. 2018-129743

(51) Int. Cl.
G06F 3/12 (2006.01)
H04L 12/24 (2006.01)
G06F 11/07 (2006.01)
G06N 20/00 (2019.01)

(52) U.S. Cl.
CPC ............ *G06F 3/121* (2013.01); *G06F 3/1234* (2013.01); *G06F 11/0709* (2013.01); *G06F 11/079* (2013.01); *G06F 11/0736* (2013.01); *G06F 11/0751* (2013.01); *G06F 11/0787* (2013.01); *G06N 20/00* (2019.01); *H04L 41/065* (2013.01); *H04L 41/0686* (2013.01); *H04L 41/142* (2013.01); *H04L 41/16* (2013.01); *G06F 3/1288* (2013.01)

(58) Field of Classification Search
None
See application file for complete search history.

(56) References Cited

U.S. PATENT DOCUMENTS

2017/0147722 A1* 5/2017 Greenwood ........... G16H 50/50
2018/0144465 A1* 5/2018 Hsieh ....................... G06N 3/08

FOREIGN PATENT DOCUMENTS

JP 2006-252422 A 9/2006

* cited by examiner

*Primary Examiner* — Andrew H Lam
(74) *Attorney, Agent, or Firm* — Canon U.S.A., Inc. I.P. Division (57) ABSTRACT

In connection with an error event detected in an image forming apparatus, a fault diagnosis service server diagnoses the error event and obtains a diagnosis result for handling to be performed on the error event detected in the image forming apparatus. In a case where the diagnosis result indicates a plurality of candidates for handling to be performed on the error event, the fault diagnosis service server compares the plurality of candidates for handling to a result estimated by a diagnosis model with respect to the error event. In a case where the plurality of candidates for handling is different from the result estimated by the diagnosis model, the fault diagnosis service obtains partial operation information from a history of the image forming apparatus and executes machine relearning based on the obtained partial operation information with respect to a layer in a latter stage of a plurality of layers included in the diagnosis model, each layer performing a different estimation.

8 Claims, 9 Drawing Sheets

SYSTEM AND METHOD FOR PERFORMING FAULT DIAGNOSIS ON A DEVICE

BACKGROUND

Field

The present disclosure relates to a system that performs fault diagnosis on a device.

Description of the Related Art

Conventionally, systems have been constructed for identifying faulty parts in a case of failure in hardware, and presenting appropriate measures (e.g., replacement and cleaning) for failure recovery (collectively referred to as fault diagnosis). In particular, with improvements in the accuracy of machine learning algorithms and the like, and the spread of effective calculation environments such as cloud networks, mechanisms for performing fault diagnosis (on servers, for example) using models obtained from machine learning of data collected from a plurality of devices have been discussed in recent years.

Japanese Patent Application Laid-Open No. 2006-252422 describes a system that receives a fault signal from a subsystem and performs fault diagnosis. In a case where a plurality of fault signals is received, the system selects a candidate solution having a high probability of success, from past combination cases, and outputs a diagnosis result corresponding to the candidate solution.

According to the technique described in Japanese Patent Application Laid-Open No. 2006-252422, a signal received from a device is checked by referring to past results, and a candidate solution having a high probability of success is automatically selected.

However, in some cases, receiving a combination of signals from devices is an occurrence that rarely happens. In such cases, referring to past results may not be an effective way to find a solution. In such cases, it is difficult to perform a fault diagnosis with high accuracy by simply referring to past combination cases.

SUMMARY

A system includes a storage unit configured to store a model for estimating an appropriate handling for an error event detected in a network device, the model constructed by machine learning using operation information collected from the network device and histories of handling for the network device, an obtainment unit configured to obtain, in connection with the error event detected in the network device, a diagnosis result of diagnosis in the network device for identifying handling to be performed on the error event, a comparison unit configured to, in a case where the diagnosis result indicates a plurality of candidates for handling to be performed on the error event, compare the plurality of candidates for handling the error event with a result estimated for the error event using the model, and an execution unit configured to, in a case where the plurality of candidates for handling is found by the comparing to be different from the estimated result, obtain partial operation information from the history and execute machine relearning based on the obtained partial operation information with respect to a layer in a latter stage of a plurality of layers included in the model, each layer performing a different estimation.

Further features of the present disclosure will become apparent from the following description of exemplary embodiments with reference to the attached drawings.

DESCRIPTION OF THE EMBODIMENTS

Figure 1:
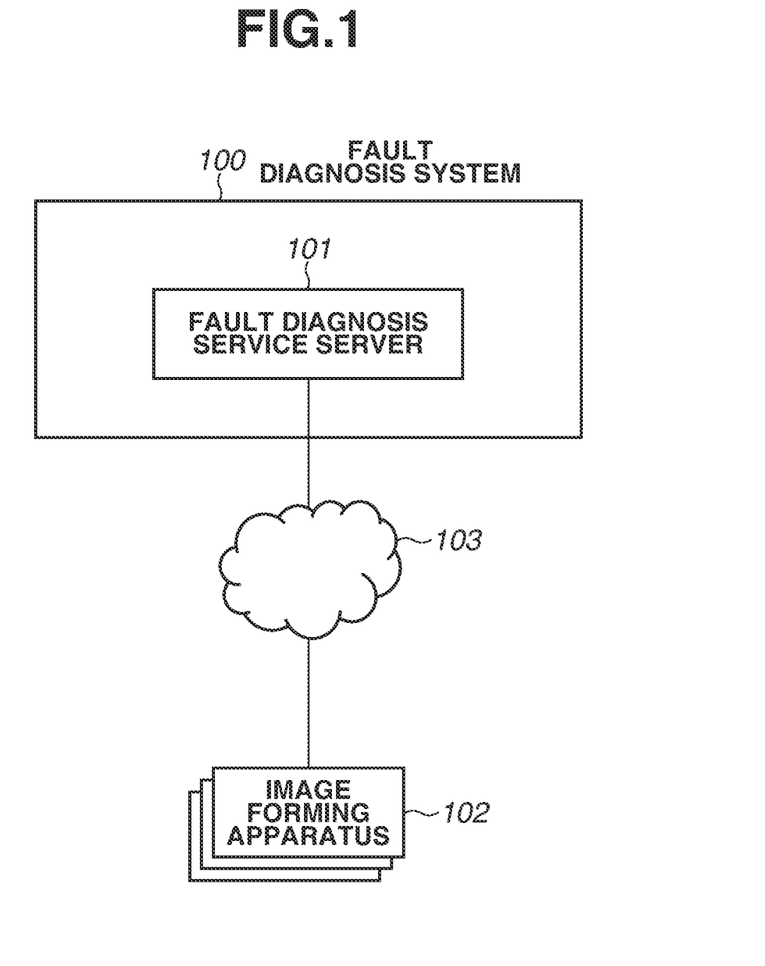
FIG. 1 is a block diagram illustrating a configuration of a system according to an exemplary embodiment.

FIG. 1 illustrates an example of a configuration of a system according to a first exemplary embodiment.

As illustrated in FIG. 1, the system according to the present exemplary embodiment is a system in which a plurality of network devices (e.g., image forming apparatuses 102 in the example in FIG. 1) can communicate with a fault diagnosis service server 101 via a network 103. According to the present exemplary embodiment, an image forming apparatus such as a printer or a multifunction peripheral is described as an example of a network device. However, the network device of the present disclosure is not limited to image forming apparatuses. The network device may be another device connectable to a network, such as a projector connectable to a network, a network camera, or various Internet of Things (IoT) devices, for example. In the following description, image forming apparatus 102 is also sometimes referred to as a "device".

The image forming apparatus 102 is connected to the fault diagnosis service server 101 via the network 103.

Functions of the fault diagnosis service server 101, and a fault diagnosis system 100 including the fault diagnosis service server 101, may be realized by a single computer or by a plurality of computers. The functions of the fault diagnosis service server 101 and the fault diagnosis system 100 may also be realized by using a cloud service or the like.

The network 103 may be any one of, or any combination of, the Internet, a local area network (LAN), a wide area network (WAN), a telephone line, a dedicated digital line, an asynchronous transfer mode (ATM) line, a frame relay line, a cable television line, and a data broadcasting radio channel The network 103 is a communication network realized by one of or by a combination of these networks.

Figure 2A:
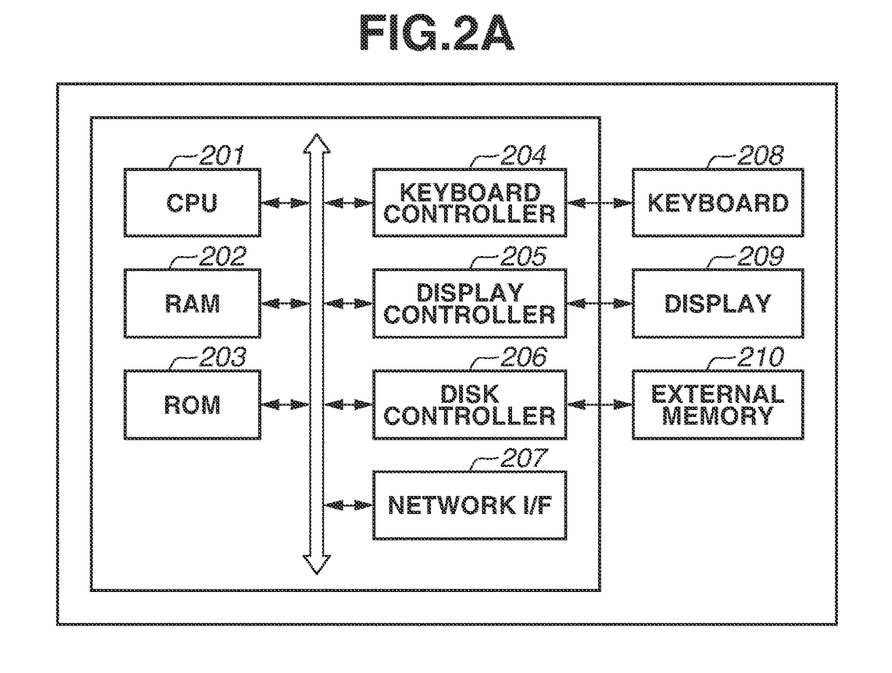
FIGS. 2A and 2B are block diagrams illustrating hardware configurations of an information processing apparatus and an image forming apparatus according to the exemplary embodiment.

FIG. 2A illustrates an example of a hardware configuration of an information processing apparatus including the fault diagnosis service server 101 and the fault diagnosis system 100. In one embodiment, the configuration can be configured by hardware of a general information processing apparatus (i.e., a personal computer (PC)).

A central processing unit (CPU) 201 controls the entire information processing apparatus by executing a program stored in a read-only memory (ROM) 203 and a program of an operating system (OS), an application, and the like loaded from an external memory 210 to a random access memory (RAM) 202. In other words, in various embodiments, the CPU 201 functions as each processing unit that executes processing in each flowchart described below by executing the programs stored in the readable storage medium.

The RAM 202 is a main memory of the CPU 201 and functions as a work area and the like.

The ROM 203 stores various programs and data.

A keyboard controller 204 controls an operation input from a keyboard 208 and a pointing device (e.g., a mouse, a touch pad, a touch panel, and a trackball) not illustrated. A display controller 205 controls display on a display 209.

A disk controller 206 controls data access to the external memory 210 such as a hard disk drive (HDD) and a solid state drive (SSD) for storing various data.

A network interface (I/F) 207 is connected to the network and executes communication control processing with respect to another device connected to the network.

Figure 2B:
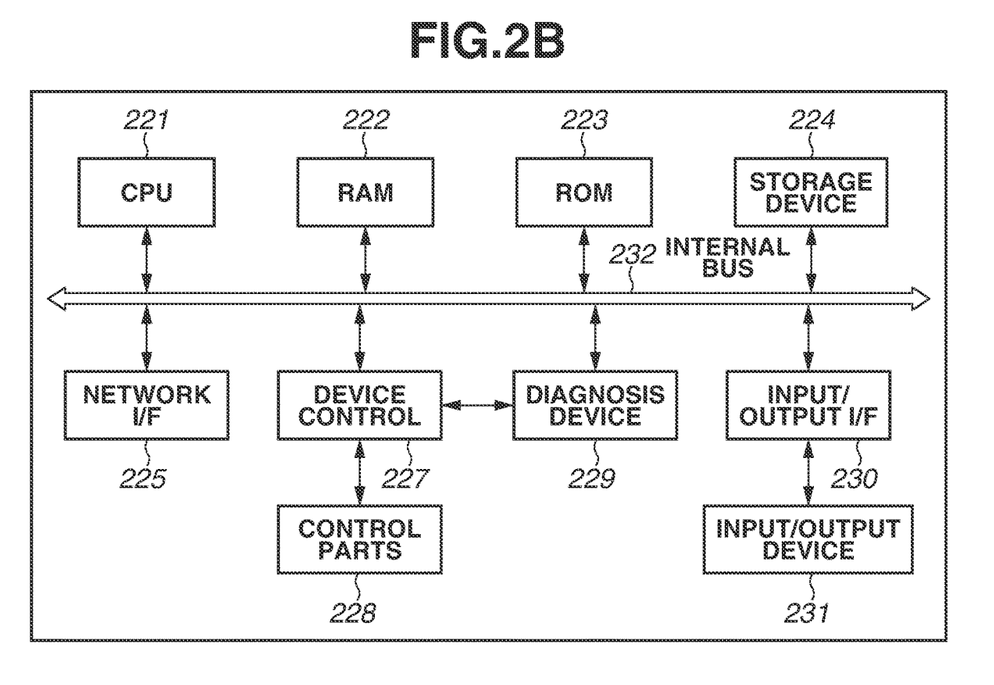

FIG. 2B illustrates an example of a hardware configuration of the image forming apparatus 102.

The image forming apparatus 102 may be, for example, a digital multifunction peripheral, a facsimile apparatus, a laser beam printer, an inkjet printer, or a scanner apparatus.

A CPU 221 includes a program stored in a ROM 223 (a program for realizing each processing in the image forming apparatus described below is included) and comprehensively controls each device via an internal bus 232. A RAM 222 functions as a memory and a work area of the CPU 221. A storage device 224 functions as an external storage device. The CPU 221 performs execution processing of the program in cooperation with the RAM 222 and the ROM 223 and also performs processing for recording image data into a recording medium such as the storage device 224. The storage device 224 includes, for example, a HDD, an SSD, or a combination thereof.

A network I/F 225 uni-directionally or bi-directionally exchanges data with an external network device.

A device control 227 is a controller for controlling various control parts 228 of the device. The control parts include part groups such as a printing unit and a scanner unit for realizing various functions of the image forming apparatus.

A diagnosis device 229 analyzes and identifies a location as a factor in a failure in the image forming apparatus 102. The diagnosis device 229 applies an electric current to various parts via the device control 227 to determine operation situations of the various control parts 228 and identifies presence or absence of failure.

An input/output device 231 has a plurality of functions for performing input and output in the image forming apparatus 102. More specifically, the input/output device 231 receives an input (button input) from a user and transmits a signal corresponding to the input to each processing unit described above via an input/output I/F 230. Further, the input/output device 231 includes a display device (e.g., touch panel) for providing a user with necessary information and receiving a user operation. In addition, the input/output device 231 may include a scanner apparatus for reading a document and receiving electronic data as an input.

Figure 3:
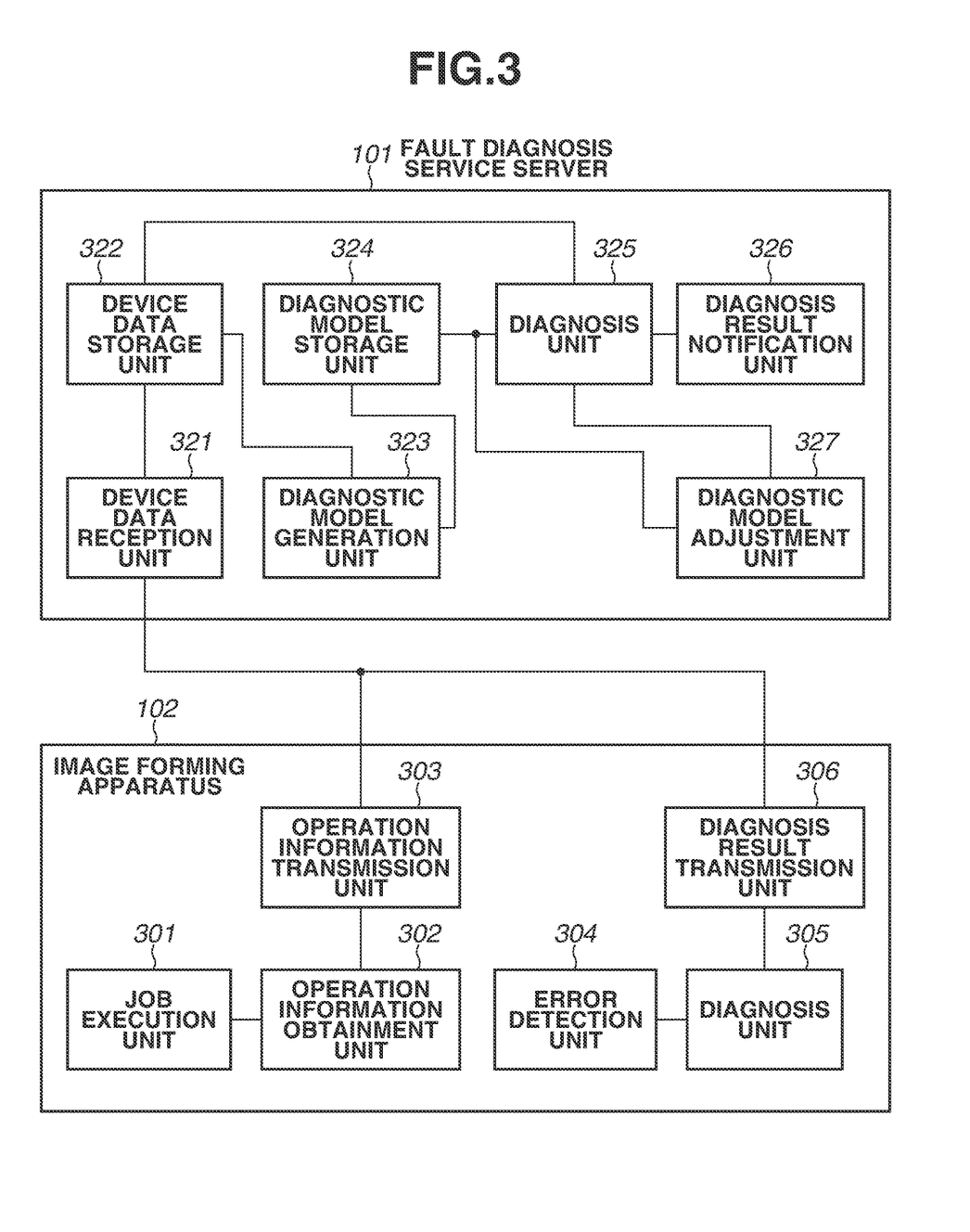
FIG. 3 is a functional block diagram of the system according to the exemplary embodiment.

FIG. 3 is a functional block diagram illustrating an example of functions of the system according to the present exemplary embodiment.

The functions of the system according to the present exemplary embodiment can be roughly divided into three types, namely a "device data accumulation function", a "diagnostic model regular generation function", and a "fault diagnosis function in the event of an error". Each of the functions is described below with reference to FIGS. 3 to 9B. Schemas and data of Tables described below are merely examples, and schemas of Tables and formats of various data can be changed appropriately according to various embodiments.

Each of the function units 321 to 327 of the fault diagnosis service server 101 illustrated in FIG. 3 is stored as a program in the ROM 203 of the information processing apparatus configured as the fault diagnosis service server 101 and is realized by being executed by the CPU 201 in the RAM 202. Each of the function units 301 to 306 of the image forming apparatus 102 is stored as a program in the ROM 223 and is realized by being executed by the CPU 221 in the RAM 222. Each of the function units is described together with descriptions of flowcharts.

The "device data accumulation function" is described with reference to FIGS. 3 and 4.

Figure 4:
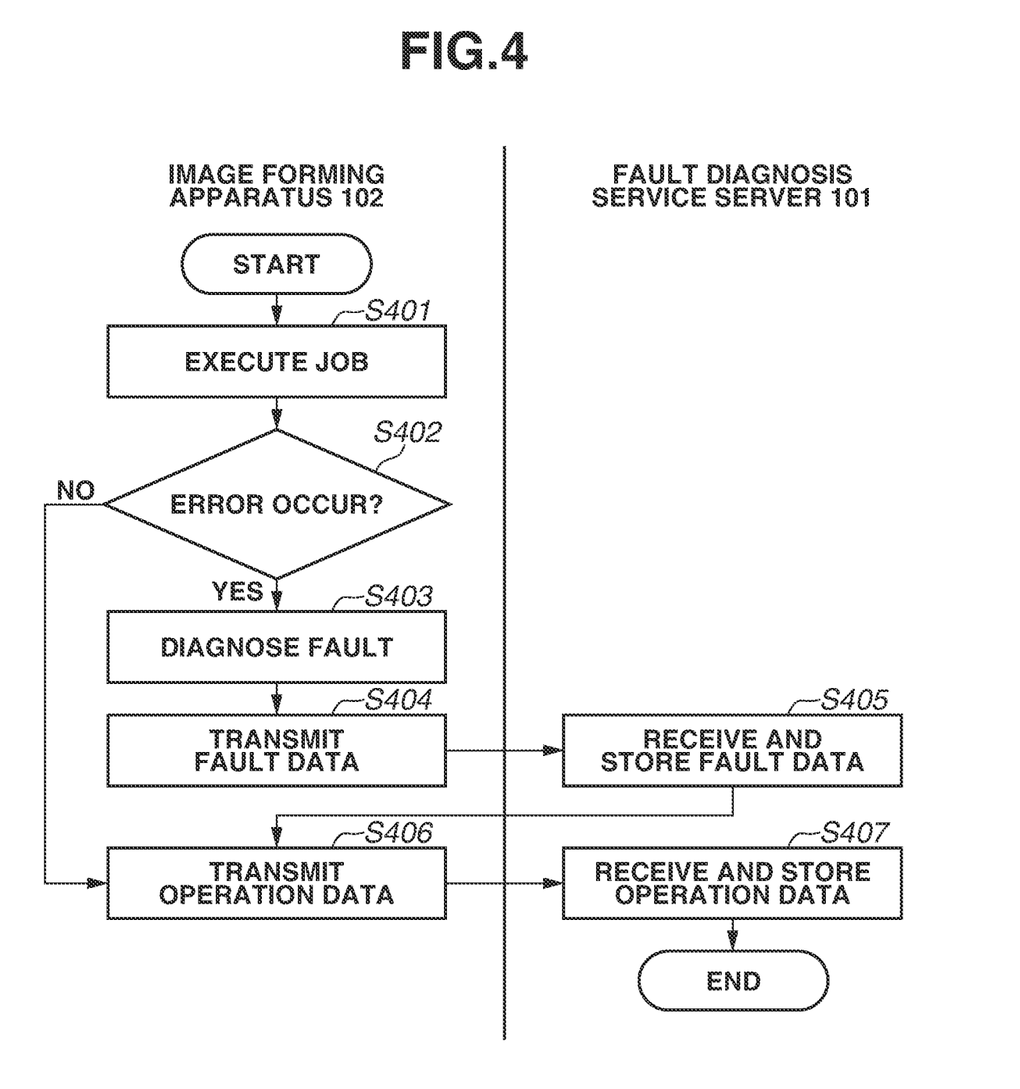
FIG. 4 is a flowchart illustrating processing for accumulating device data according to the present exemplary embodiment.

FIG. 4 is a flowchart illustrating an example of processing for accumulating device data according to the present exemplary embodiment. The processing illustrated in the flowchart is executed by each of the function units of the image forming apparatus 102 and each of the function units of the fault diagnosis service server 101 illustrated in FIG. 3.

In step S401, a job execution unit 301 executes a job such as printing and scanning in the image forming apparatus 102.

Next, in step S402, an error detection unit 304 determines whether an error occurs during execution of the job in step S401. In a case where the error detection unit 304 determines that the error does not occur (NO in step S402), the processing proceeds to step S406.

On the other hand, in a case where the error detection unit 304 determines that the error occurs (YES in step S402), the processing proceeds to step S403.

In step S403, a diagnosis unit 305 identifies a faulty part that causes the error detected in step S402 (fault diagnosis). As a method for identifying a faulty part, for example, in a case where failure in a motor is determined, a method can be considered in which the motor is applied with a current, and presence or absence of failure in a part of the motor is identified depending on whether the motor can rotate. According to the present exemplary embodiment, three patterns (patterns A, B, and C) in Table 1 described below are assumed as results of the above-described identification.

TABLE 1

| Pattern | Contents | Fault Code Example |
|---------|----------|--------------------|
| A | One or more faulty parts are identified. | 001-0000 |
| B | One or more parts having a failure possibility are identified. | 002-0000 002-0001 |
| C | Failure cannot be identified. | 999-0000 |

The pattern A is a case where the diagnosis unit 305 can identify a faulty part. If there is a plurality of faulty parts, all of the faulty parts are identified.

The pattern B is a case where the diagnosis unit 305 can only identify that any of the parts is faulty among a plurality of identified parts. For example, a case in which the diagnosis unit 305 can only identify that either one of two parts "motor" and "cable" is faulty corresponds to the pattern B.

The pattern C is a case where the diagnosis unit 305 cannot identify any of the faulty parts (including a possibility of failure). For example, a case where the diagnosis unit 305 cannot perform diagnosis processing corresponds to the pattern C.

The diagnosis unit 305 outputs a fault code indicated in Table 1 as a diagnosis result. The fault code indicated in Table 1 includes a former three-digit number indicating each of the above-described patterns and a latter four-digit number indicating a faulty part.

More specifically, "001", "002", and "999" in the former three-digit number respectively indicate the pattern A, the pattern B, and the pattern C.

Further, for example, "0000", "0001", and "0002" in the latter four-digit number respectively indicate a "substrate", a "motor", and a "cable". In this case, the latter four-digit number in the fault code written in a row of the pattern A is "0000", so that the fault code indicates that the "substrate" is determined to be faulty. Further, the latter four-digit number in the fault codes written in a row of the pattern B are "0000" and "0001", so that the fault codes indicate that either of the "substrate" and the "cable" is identified as faulty. Only in a case of "999" in the former three-digit number (i.e., the case of the pattern C), the latter four-digit number has no meaning. As described above, the fault code indicated in Table 1 includes code information of the pattern (former three-digit number) indicating that handling (error handling) to be performed on an error event detected in the image forming apparatus 102 is identified and code information (latter four-digit number) indicating the handling. A case is described as an example in which a part as a factor of an error event is replaced as the error handling, and a code for identifying the part is written in the latter four-digit number. However, in a case where a measure other than replacement (e.g., cleaning) is performed as the error handling with respect to the part as the factor of the error event, a code indicating that the part is cleaned is written in the latter four-digit number. In a case where a specific operation (e.g., restart of device) is performed as the error handling, a code indicating the operation is written in the latter four-digit number. The error handling is not limited to the above-described examples.

Next, in step S404, a diagnosis result transmission unit 306 transmits fault data to the fault diagnosis service server 101 based on the diagnosis result in step S403. The fault data includes the above-described fault code, an error identification (ID) indicating a content of the error, date and time of fault occurrence, and a job ID uniquely identifying the job executed in step S401.

In step S405, a device data reception unit 321 in the fault diagnosis service server 101 receives the fault data transmitted from the image forming apparatus 102 in step S404 and stores the fault data in a device data storage unit 322 in a format of, for example, Table 2 described below. The fault data is not limited to information indicated in Table 2, and other pieces of information may be included therein.

TABLE 2

| Error ID | Fault Code | Occurrence Date and Time | Job ID |
| --- | --- | --- | --- |
| E002 | 001-0000 | 2018-05-01 10:00:01 | J00001 |
| E190 | 002-0000 | 2018-05-01 10:30:31 | J00100 |
|  | 002-0001 |  |  |
|  | 002-0002 |  |  |
| E720 | 999-0000 | 2018-05-02 20:20:01 | J00233 |

In step S406, an operation information obtainment unit 302 in the image forming apparatus 102 obtains various pieces of information such as the job ID of the job executed in step S401 and information changed by the execution of the job. The information changed by the execution of the job includes, for example, the total number of sheets printed by the device, temperature and humidity in the device, and abrasion degrees of various parts (e.g., a drum, a transfer belt, and a fixing device). Further, an operation information transmission unit 303 transmits the various pieces of obtained information to the fault diagnosis service server 101 as operation data.

In step S407, the device data reception unit 321 in the fault diagnosis service server 101 receives the operation data transmitted from the image forming apparatus 102 in step S406 and stores the operation data in the device data storage unit 322 in a format of, for example, Table 3 described below. The operation data is not limited to information indicated in Table 3, and other pieces of information may be included therein.

TABLE 3

| Job ID | Number of Print Sheets | Temperature in Device | Abrasion Degree of Drum |
| --- | --- | --- | --- |
| J00001 | 10000 | 50 degrees | 30% |
| J00002 | 10200 | 45 degrees | 20% |
| J00003 | 12032 | 100 degrees | 80% |

As described above, the processing illustrated in FIG. 4 is executed, and thus the operation data of the device and the fault data as the fault diagnosis result can be stored in the device data storage unit 322 of the fault diagnosis service server 101. In this way, the operation data (operation information) collected from the device and a history of the fault data (error handling) are accumulated. Thus, the fault diagnosis service server 101 can use the various data in machine learning for a diagnostic model described below. The fault data corresponding to the pattern B and the pattern C stored in the fault diagnosis service server 101 are manually updated in a case where the error handling (e.g., fault location) is then identified by a service person or other worker. At this time, the former three-digit number in the fault code is updated to "001". According to the present exemplary embodiment, the operation data and the fault data are associated with each other based on the job ID, but can be associated with each other based on other information. For example, date information is included in the operation data, and the operation data and the fault data may be associated with each other based on date and time.

The "diagnostic model regular generation function" is described with reference to FIGS. 3, 5, and 8. It is assumed that a certain amount of the device data is accumulated and stored in the fault diagnosis service server 101 by the above-described "device data accumulation function". Further, it is assumed that the present processing is executed at a regular timing such as once a day and once a week.

Figure 5:
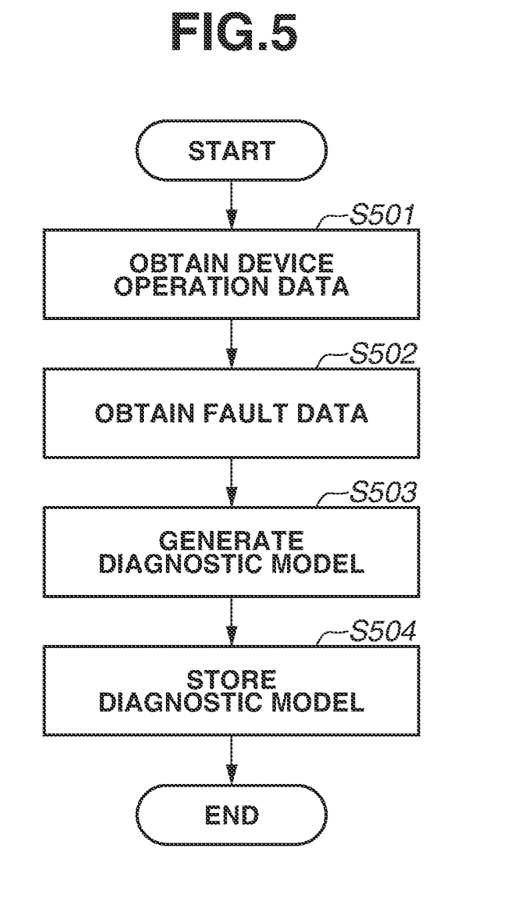
FIG. 5 is a flowchart illustrating processing for diagnostic model construction according to the exemplary embodiment.

FIG. 5 is a flowchart illustrating an example of processing for diagnostic model construction according to the present exemplary embodiment. The processing illustrated in this flowchart is executed by each of the function units of the fault diagnosis service server 101 illustrated in FIG. 3.

In step S501, a diagnostic model generation unit 323 obtains device operation data stored in the device data storage unit 322.

In step S502, the diagnostic model generation unit 323 obtains the fault data stored in the device data storage unit 322.

Next, in step S503, the diagnostic model generation unit 323 constructs a diagnostic model by machine learning using the data obtained in steps S501 and S502. The data to be used for the machine learning is the fault data in the pattern A (a fault location is identified) and the operation data associated with the fault data through the same job ID as that of the fault data. An example of the diagnostic model to be constructed is described. According to the present exemplary embodiment, a feed-forward multi-layer neural network is described as an example of the diagnostic model. However, a model other than the feed-forward multi-layer neural network may be used. Now, the feed-forward multi-layer neural network is described with reference to FIG. 8.

Figure 8:
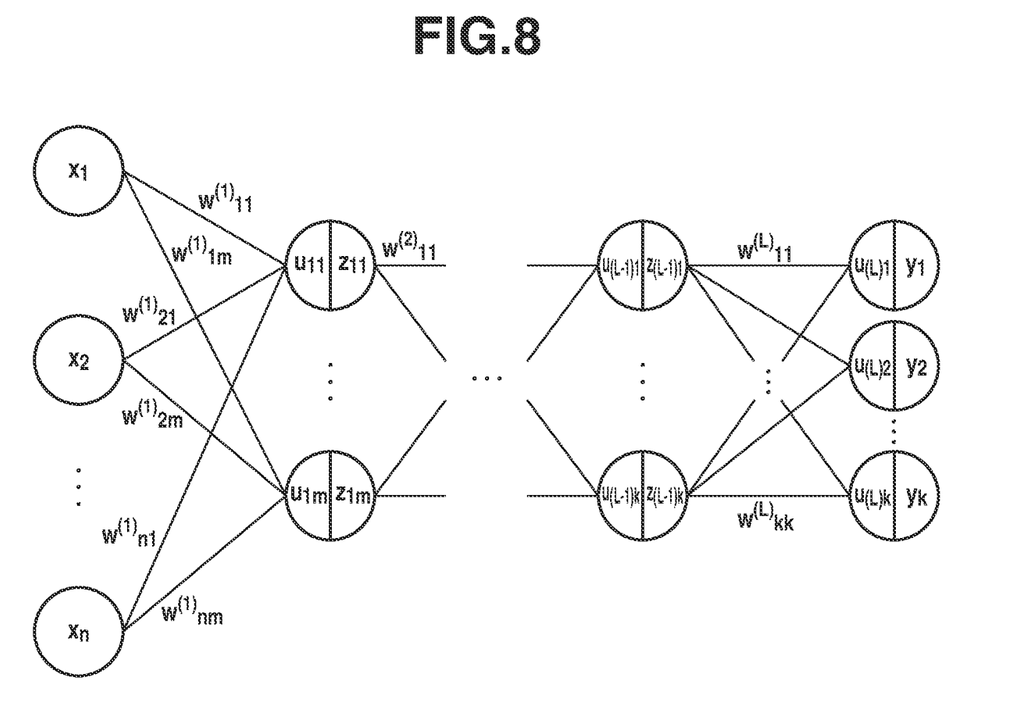
FIG. 8 illustrates a diagnostic model according to the exemplary embodiment.

FIG. 8 illustrates a feed-forward multi-layer neural network as an example of a diagnostic model according to the present exemplary embodiment. The feed-forward multi-layer neural network is schematically described with reference to FIG. 8.

Terms "$x_1$" to "$x_n$" written in FIG. 8 are feature amounts in construction of the present diagnostic model. FIG. 8 indicates that there are n feature amounts. As the feature amounts, use of the operation data of the device (e.g., number of printed sheets, temperature in the device, and abrasion degree of a drum) as described above in Table 3 can be considered. The diagnostic model to be constructed here may be constructed for each error (error ID included in the fault data in Table 2) and may be a diagnostic model common to all errors. In a case where the diagnostic model is constructed for each error ID, the diagnostic model corresponding to a certain error is constructed by learning the operation data and a history of the faulty part when the certain error (the error ID) occurs. In a case where the diagnostic model for estimation is constructed by a diagnostic model which is used in common regardless of types of errors, the feature amount may include, for example, not only the operation data but also the error ID.

The diagnostic model is aimed at outputting a failure probability of a part from an output layer (node group on a rightmost column in FIG. 8) in a case where a certain feature amount is input to an input layer (node group on a leftmost column in FIG. 8). Terms "$y_1$" to "$y_k$" written in the output layer indicate the failure probability of the part output from the present diagnostic model. A suffix k in FIG. 8 indicates the number of patterns of the faulty part.

A term $w^{(a)}_{bc}$ in FIG. 8 is a weight which is adjusted so as to cause a failure probability of a faulty part, which is identified, corresponding to a certain feature amount to be highest in a case where the certain feature amount is input in construction of the diagnostic model (details are described below). Adjustment of the weight is referred to as learning of the diagnostic model.

Each of the suffixes in the weight $w^{(a)}_{bc}$ is described.

The suffix "a" indicates a weight on an a-th layer in a multi-layer neural network. The suffix "b" indicates a node (a unit indicated by a circle in FIG. 8) of an input source. The suffix "c" indicates a node of an output destination.

In FIG. 8, suffixes "j" and "k" of a term $u_{jk}$ indicate a k-th node of a j-th layer.

The term $u_{jk}$ can be calculated by Formula (1) described below.

$$u_{jk} = \Sigma w_{ik}^{(j)} x_i \quad (1)$$

A term $z_{jk}$ is a value obtained as a result by applying an activation function to the term $u_{jk}$. As the activation function, a rectified linear unit (ReLU) "f(u)=max(u,0)" is well known.

The output layer (node group on the rightmost column in FIG. 8) is described.

The diagnostic model is aimed at outputting a part having a highest possibility of failure among a plurality of parts in a case where the feature amount is input, so that it can be considered that the diagnostic model matches a category generally referred to as multi-class classification. According to the present exemplary embodiment, a softmax function is selected as the activation function for the output layer, and an output value $y_k$ of a k-th node is calculated by Formula (2) described below.

$$y_k = \frac{\exp(u_{Lk})}{\sum_{j=1}^{} \exp(u_{Lj})} \quad (2)$$

The value $y_k$ can be regarded as a pseudo probability, and according to the present exemplary embodiment, a part corresponding to a node of which the value $y_k$ is the largest is diagnosed as a faulty part.

As described above, in weight learning, learning is performed so that, in a case where a certain feature amount is input, an output value of a node corresponding to a faulty part, which is identified, corresponding to the certain feature amount becomes highest. More specifically, an error between a part indicated by the value $y_k$ which is output based on the input feature amount and a faulty part which is actually faulty corresponding to the feature amount (i.e., correct answer data) is calculated using cross entropy, and the weight is adjusted so as to minimize the error using backpropagation or the like. According to the present exemplary embodiment, the weight is adjusted so as to minimize the error between the part indicated by the value $y_k$ which is output with respect to the operation data input as the feature amount $u_i$ and the part which is identified as faulty by the fault data associated with the same job ID as that of the operation data (i.e., correct answer data). The feed-forward multi-layer neural network is constructed by performing the above-described processing.

In FIG. 8, a portion other than the input layer and the output layer is referred to as an intermediate layer. Generally, in a case where a multi-layer neural network (i.e., Deep Learning) is constructed, autoencoding and setting of dropout for improving generalization performance are often performed. While descriptions thereof are omitted, their algorithms may be applied to the present exemplary embodiment. Various hyper-parameters such as the number of intermediate layers and a dropout rate are experimentally obtained in advance. As described above, in step S503, the diagnostic model is constructed by learning the weight based on the stored operation data and fault data.

The description returns to FIG. 5.

In step S504, the diagnostic model generation unit 323 stores the weight value learned in step S503 in a diagnostic model storage unit 324, and the processing in the present flowchart is terminated.

As described above, the diagnostic model that can present the faulty part based on the operation data of the device can be constructed by performing the processing in the flowchart in FIG. 5. Accordingly, the diagnostic model generated as described above is stored in the fault diagnosis service server 101.

The "fault diagnosis function for a case of an error occurrence" is described with reference to FIGS. 3, 6, 7, 9A, and 9B. It is assumed that the diagnostic model is constructed by the above-described "diagnostic model regular generation function".

Figure 6:
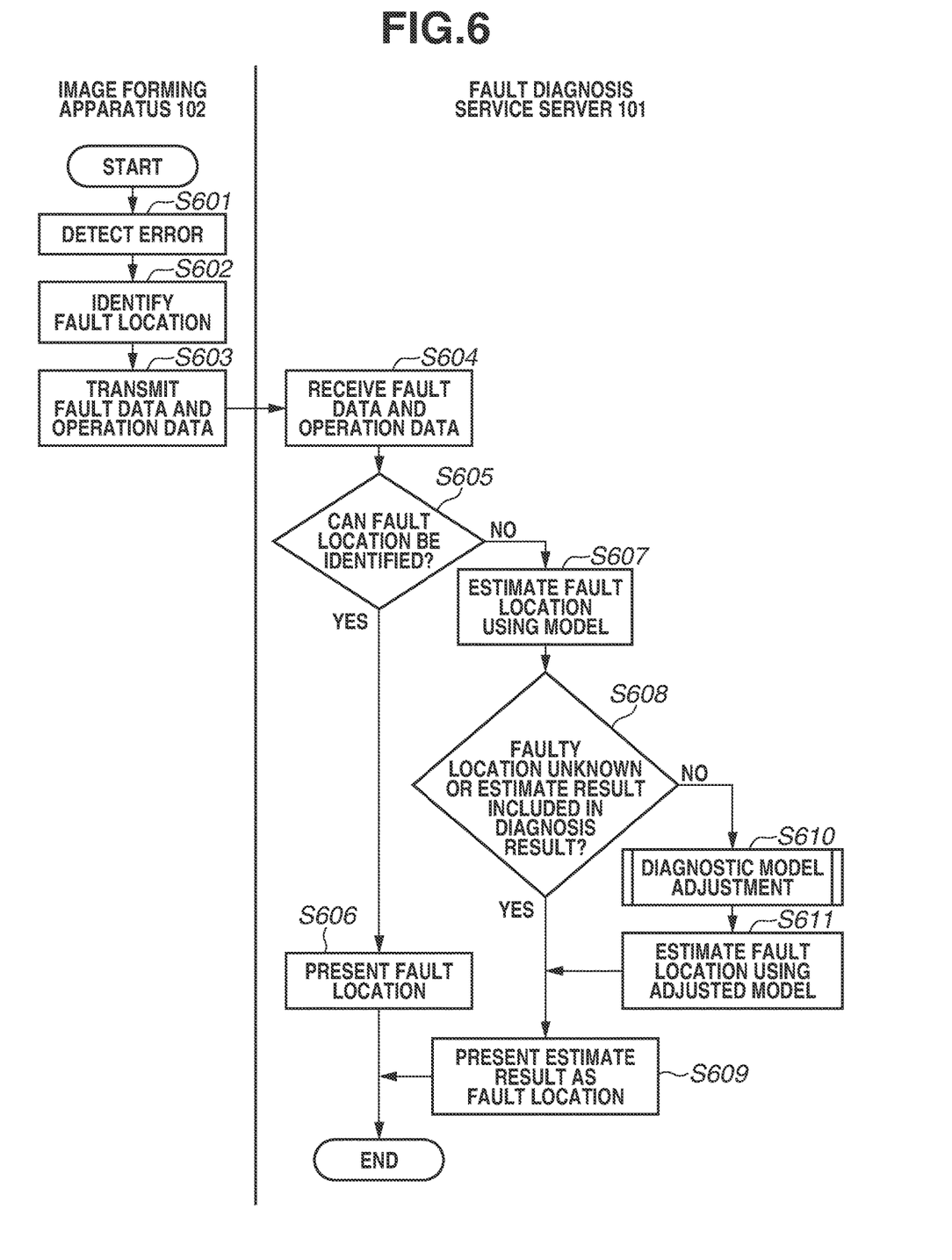
FIG. 6 is a flowchart illustrating processing for fault diagnosis according to the exemplary embodiment.

FIG. 6 is a flowchart illustrating an example of processing for fault diagnosis according to the present exemplary embodiment. The processing illustrated in this flowchart is executed by each of the function units of the image forming apparatus 102 and each of the function units of the fault diagnosis service server 101 illustrated in FIG. 3. The flowchart in FIG. 6 illustrates only a case where an error occurs, and the descriptions are partially simplified from those of the transmission processing of the fault data and the operation data described in the flowchart in FIG. 4.

In step S601, the error detection unit 304 in the image forming apparatus 102 detects an error, and in step S602, the diagnosis unit 305 identifies the faulty part and obtains the fault code as described in FIG. 4.

In step S603, the diagnosis result transmission unit 306 transmits the fault data including the fault code obtained in step S602 and the operation data at that time to the fault diagnosis service server 101. While the descriptions of steps S601 to S603 are simplified, processing to be performed therein is similar to that in steps S402, S403, S404 and S406 in FIG. 4.

In step S604, the device data reception unit 321 in the fault diagnosis service server 101 receives the fault data including the fault code and the operation data, and stores the fault data and the operation data in the device data storage unit 322. While the description of step S604 is simplified, processing to be performed therein is similar to that in steps S405 and S407 in FIG. 4.

Next, in step S605, a diagnosis unit 325 checks the pattern of the fault code received in step S604 and determines whether the pattern is the pattern A (faulty part can be identified). In a case where the pattern is determined as the pattern A (faulty part can be identified) (YES in step S605), the processing proceeds to step S606.

In step S606, a diagnosis result notification unit 326 presents a part (fault location) indicated by the received fault code (e.g., by displaying on a browser and notifying an associated system destination).

On the other hand, in step S605, in a case where the diagnosis unit 325 determines that the pattern of the fault code received in step S604 is not the pattern A (faulty part cannot be identified) (NO in step S605), the processing proceeds to step S607. In other words, in a case where there is a plurality of parts having a possibility of failure (the fault code is the pattern B), or any faulty part (including a possibility of failure) cannot be identified (fault code is the pattern C) (NO in step S605), the processing proceeds to step S607.

In step S607, the diagnosis unit 325 obtains the learned diagnostic model (weight) from the diagnostic model storage unit 324 and calculates (estimates) a part having the highest failure probability by applying the learned diagnostic model (weight) to the operation data received in step S603. For example, it is assumed that values indicated in Table 4 below are output from the diagnostic model.

TABLE 4

| faulty Part | Output Value |
| --- | --- |
| Substrate | 0.85 |
| Cable | 0.12 |
| Motor | 0.03 |

In the case of the example illustrated in Table 4, an output value of the "substrate" is the highest, so that the "substrate" is diagnosed as a faulty part.

In step S608, the diagnosis unit 325 determines whether the pattern of the fault code received in step S604 is the pattern C, or whether the faulty part estimated as the fault location in step S607 is included in the faulty part indicated by the fault code received in step S603. The pattern C corresponds to a case where any faulty part (including a possibility of failure) cannot be identified.

In a case where it is determined that the pattern of the fault code is the pattern C, or the estimated faulty part is included in the faulty part indicated by the received fault code (YES in step S608), the processing proceeds to step S609.

On the other hand, in a case where it is determined that the pattern of the fault code is not the pattern C but the pattern B, and the estimated faulty part is not included in the faulty part indicated by the received fault code (NO in step S608), the processing proceeds to step S610, and control is performed to execute processing described below with reference to FIG. 7. The pattern B corresponds to a case where there is a plurality of parts having the possibility of failure, and the fault code includes a code indicating the part having the possibility of failure.

Branch processing in step S608 is briefly described here.

A construction algorithm of a diagnostic model constructed on a server has a background based on a statistical concept. More specifically, in a case where determination is made based on past data, it can be said that a probability of failure is stochastically the highest, but it cannot be said that a faulty part presented corresponding to an error currently occurs is faulty with the probability of 100%. On the other hand, the faulty part indicated by the fault code transmitted from the image forming apparatus 102 is a candidate of the part determined as faulty after checking that the part does not operate in the manner of hardware, so that it can be determined that any of the parts indicated by a plurality of the fault codes is faulty with the probability of almost 100%. Thus, only in a case where the faulty part obtained in the hardware manner is different from the faulty part calculated by the diagnostic model, processing described below with reference to FIG. 7 is performed, and the diagnostic model is adjusted so as to fit an estimation result to the faulty part obtained in the hardware manner.

In step S609, the diagnosis result notification unit 326 presents the part having the highest failure probability (fault location) calculated by the diagnostic model (e.g., by displaying on the browser and notifying the associated system destination).

In step S610, a diagnostic model adjustment unit 327 adjusts the diagnostic model. Diagnostic model adjustment processing (relearning) in step S610 is described below with reference to FIG. 7.

In step S611, the diagnosis unit 325 diagnoses the faulty part using the diagnostic model adjusted by the diagnostic model adjustment unit 327 in step S610. As the diagnosis result, the failure probability is output for each part as with the ones described referring to Table 4. In step S609, the diagnosis result notification unit 326 presents the part having the highest failure probability (fault location) calculated by the diagnostic model.

The diagnostic model adjustment processing in step S610 in FIG. 6 is described in detail with reference to FIGS. 7, 9A, and 9B.

Figure 7:
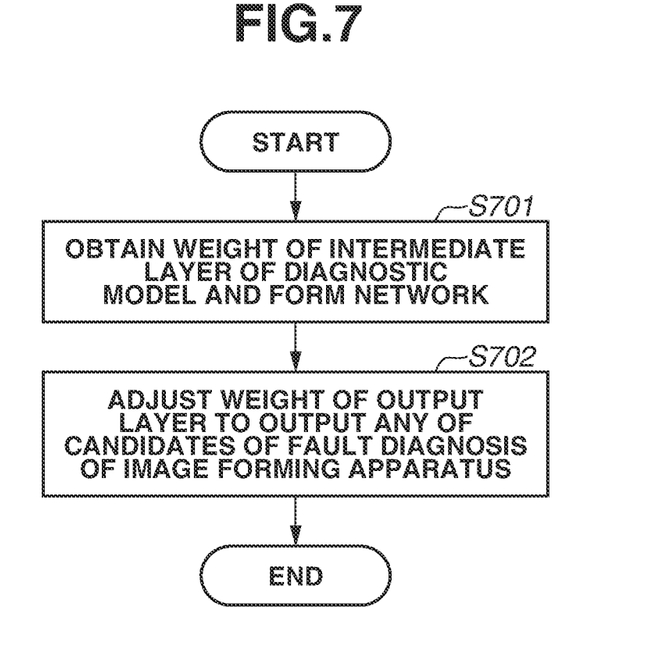
FIG. 7 is a flowchart illustrating processing for diagnostic model adjustment according to the exemplary embodiment.

FIG. 7 is a flowchart illustrating an example of processing for diagnostic model adjustment (diagnostic model adjustment processing) according to the first exemplary embodiment. The processing illustrated in this flowchart is executed by the diagnostic model adjustment unit 327 in the fault diagnosis service server 101 illustrated in FIG. 3.

Figure 9A:
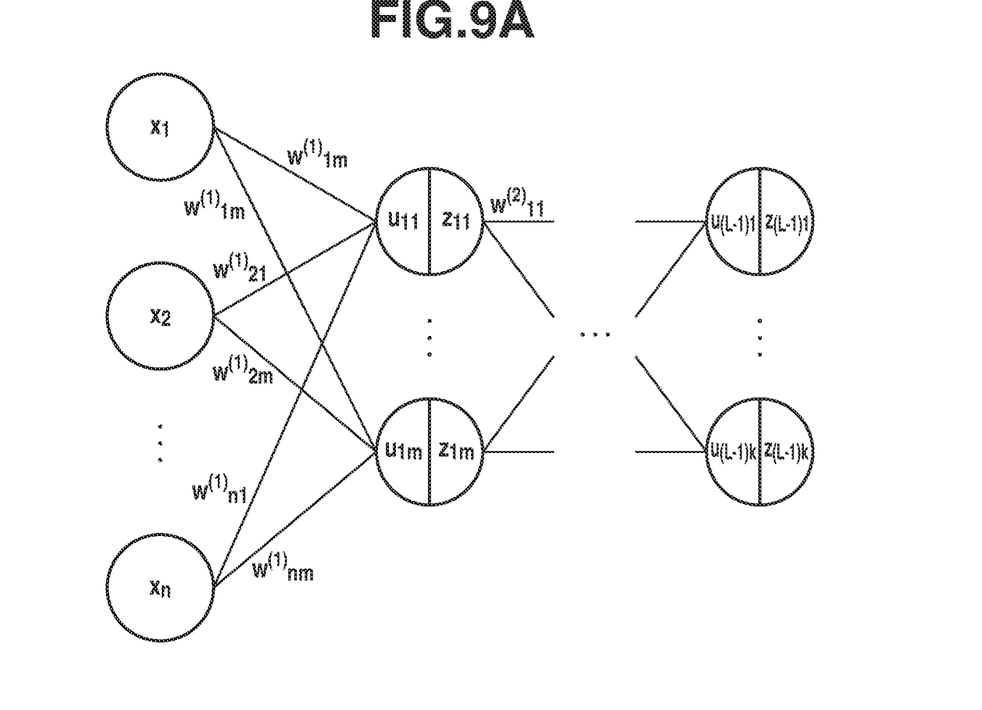
FIGS. 9A and 9B respectively illustrate diagnostic models being adjusted and after the adjustment according to the exemplary embodiment.
Figure 9B:
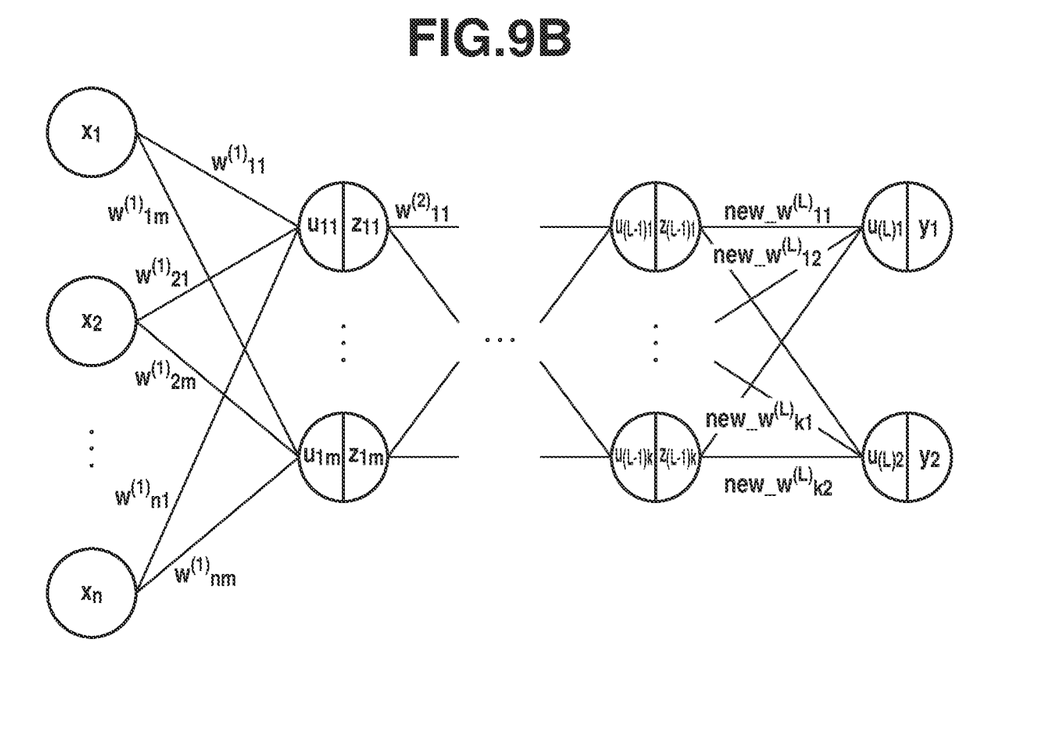

FIGS. 9A and 9B respectively illustrate examples of diagnostic models that are being adjusted and after the adjustment according to the first exemplary embodiment.

In step S701, the diagnostic model adjustment unit 327 obtains the weight ($w^{(a)}_{bd}$) of the above-described intermediate layer from the diagnostic model storage unit 324 and constructs a neural network (namely a neural network being adjusted) expressed by the weight. The neural network constructed at this time is the same as the one excluding a final layer of the neural network from the neural network described in FIG. 8 as illustrated in FIG. 9A.

In step S702, the diagnostic model adjustment unit 327 designs (adjusts) the output layer (layer at the last stage) of the neural network so as to only output a part (candidate of the faulty part) expressed by the fault code (received in step S604 in FIG. 6) having a failure possibility received at present. FIG. 9B illustrates an example of the designed neural network (i.e., neural network after the adjustment).

Adjustment of the neural network is described below using a specific example.

For example, it is assumed that two fault codes "002-0000" and "002-0001" are received in step S604 in FIG. 6. More specifically, it is assumed that a possibility that either the "substrate" or the "cable" is faulty (i.e., candidates of the fault locations) is notified from the device as described in Tables 1 and 2. In this case, as illustrated in FIG. 9B, only two nodes ($y_1$ and $y_2$) corresponding to the "substrate" and the "cable" are prepared as nodes in the output layer. Next, the fault data, which has been already identified, in which any one of the substrate and the cable is actually faulty and the operation data corresponding to the fault data (associated with the fault data by the job ID) are obtained from the diagnostic model storage unit 324 as learning data, and the data is learned. In the learning, only new weights to these two nodes from the last nodes in the intermediate layer (new_$w^{(L)}_{11}$, new_$w^{(L)}_{12}$, . . . , new_$w^{(L)}_{k1}$, new_$w^{(L)}_{k2}$ in FIG. 9B) are learned.

Meaning of learning only the weight in the final layer performed in this present step is briefly described.

It is generally said that, in a multi-layer neural network, a feature appropriately expressing an input feature amount is extracted at an intermediate layer especially in a case where autoencoding is performed. This tendency is particularly noticeable in a neural network in an image recognition system. For example, it is said that a weight for extracting only a very simple feature such as a straight line and a point is calculated as a weight in early layers, whereas a weight that can extract a more advanced feature, such as a polygonal line and a figure formed by a combination of polygonal lines, is calculated as the calculation proceeds to latter layers. A technique referred to as transfer learning can generate a highly accurate diagnostic model at a small calculation cost by utilizing features of a multi-layer neural network and reusing an intermediate layer which is once learned. In a case of learning of a multi-layer neural network, there are many weights to be learned, and thus a very long calculation time is required. However, in a case of learning of only the final layer as described in the present exemplary embodiment, a calculation time can be reduced.

As described above, the fault diagnosis system according to the first exemplary embodiment is constructed, so that the diagnostic model reflecting a device diagnosis result can be constructed, and accuracy of fault diagnosis can be improved.

According to the above-described exemplary embodiment, the configuration is described in which the identified faulty part is not compared with the estimation result using the identified faulty part and the model in a case where the fault code received in step S604 in FIG. 6 is determined as the pattern A (faulty part can be identified) (YES in step S605). However, even in this case, the identified faulty part may be compared with the estimation result using the model in steps S607 and S608, the diagnostic model may be adjusted in a case where the identified faulty part is different from the estimation result in step S610, and estimation may be performed using the adjusted model in step S611.

A second exemplary embodiment is described below regarding only points different from the first exemplary embodiment, and descriptions of the same points are omitted. According to the above-described first exemplary embodiment, the configuration is described in which a part having the highest probability is presented as a faulty part based on a value output by the diagnosis unit 325 (pseudo probability based on a softmax function).

However, it is obvious from the above-described formula of the softmax function, the failure probability of each part is not calculated between "0" to "1", and an output is normalized so that a total sum of all output values is "1". For example, if there are three faulty parts indicated by the fault codes from the image forming apparatus 102, output values can be in a pattern as indicated in Table 5 below.

TABLE 5

| faulty Part | Output Value |
|---|---|
| Substrate | 0.45 |
| Cable | 0.43 |
| Motor | 0.12 |

In this case, a faulty part having the highest probability is a "substrate", and a probability value is "0.45". As a result, in the case of the first exemplary embodiment, only the "substrate" is presented as the faulty part. However, there is a possibility that a plurality of parts is faulty. Further, a probability value of a "cable" is "0.43", and the probability values of the "substrate" and the "cable" are nearly equal to each other. Therefore, it can be considered that it is necessary to present a plurality of parts as faulty parts.

Therefore, according to the second exemplary embodiment, in a case where the diagnosis unit 325 presents a diagnosis result, not only a part having a highest output value but also a part having an output value with a difference from the part having the highest output value being within a predetermined threshold value are presented as faulty parts. According to the present exemplary embodiment, a value statically determined in advance is used as a "threshold value". The "threshold value" may be changeable by an administrator or others.

The other configurations are similar to those described in the first exemplary embodiment, and the descriptions thereof are omitted.

As described above, processing is performed according to the method described in the second exemplary embodiment, and thus a plurality of faulty parts can be presented.

As described above, in a case where fault diagnosis of a device is performed by combining the fault diagnosis by the device hardware and the method of machine learning, accuracy of the diagnosis result is often higher in the fault diagnosis result by the hardware. In a case where the fault diagnosis result by the hardware is different from the fault diagnosis result by machine learning, it is difficult to perform highly accurate fault diagnosis if these results are handled to be independent of each other. Accordingly, in a case where the fault diagnosis result by the hardware is different from the fault diagnosis result by the machine learning, the model for performing fault diagnosis by machine learning is adjusted using the fault diagnosis result by the hardware. In this way, the diagnostic model reflecting the device diagnosis result can be constructed, and accuracy of fault diagnosis can be improved.

As described above, according to each of the exemplary embodiments, in a case where a fault diagnosis result by a device is different from a diagnosis result by a diagnostic model constructed on a server based on past results, the model on the server side is adjusted, and a fault location is diagnosed in combinations of signals obtained from the device. With this configuration, the diagnostic model reflecting the diagnosis result in the device can be constructed, and accuracy of fault diagnosis can be improved.

Configurations and contents of the above-described various data are not limited to the ones described above, and the data may be configured with various configurations and contents according to applications and purposes.

The exemplary embodiments are described above, but other embodiments of the present disclosure can be implemented, for example, as a system, an apparatus, a method, a program, and a storage medium. More specifically, various embodiments of the present disclosure can be applied to a system including a plurality of devices or to an apparatus including a single device.

Further, configurations obtained by combining each of the above-described exemplary embodiments are all included within the scope of the present disclosure.

Other Embodiments

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-129743, filed Jul. 9, 2018, which is hereby incorporated by reference herein in its entirety.

What is claimed is:

1. A system comprising:
a storage storing a model for estimating an appropriate handling for an error event detected in a network device, the model constructed by machine learning using operation information collected from the network device and a history of handlings for the network device;
at least one memory storing instructions; and
at least one processor which, when executing the instructions, causes the system to:
obtain, based on the error event detected in the network device, a diagnosis result of diagnosis in the network device for identifying handling to be performed on the error event;
in a case where the diagnosis result indicates a plurality of candidates for handling to be performed on the error event, compare each of the plurality of candidates for handling the error event, to a result estimated with respect to the error event using the model; and
in a case where each of the plurality of candidates for handling the error event is found by the comparing to be different from the estimated result, obtain partial operation information from the history; and
execute machine relearning based on the obtained partial operation information with respect to a layer in a latter stage in a plurality of layers included in the model, each layer performing a different estimation.

2. The system according to claim 1,
wherein, in the history, the handling for the network device is associated with the operation information, and
wherein the partial operation information to be used for the machine relearning is operation information associated with, in the history, a same handling for the network device as one of the plurality of candidates.

3. The system according to claim 1, wherein the machine relearning is executed with respect to a layer in a final stage in the plurality of layers.

4. The system according to claim 3, wherein a node of the layer in the final stage is associated with the plurality of candidates for handling, and a weight from a previous layer to the node of the layer in the final stage is adjusted in the machine relearning.

5. The system according to claim 1, wherein the handling represents a specific measure for a specific part in the network device or a specific operation for the network device.

6. The system according to claim 1, wherein a result having a highest probability or a result having a probability within a predetermined threshold value from the highest probability is regarded as an estimation result in estimation using the model.

7. A method performed in a system storing a model for estimating an appropriate handling for an error event detected in a network device, the appropriate handling estimated based on operation information collected from the network device and a history of handlings for the network device, the method comprising:
   obtaining, based on an error event detected in the network device, a diagnosis result of diagnosis in the network device for identifying handling to be performed on the error event;
   in a case where the diagnosis result indicates a plurality of candidates for handling to be performed on the error event, comparing each of the plurality of candidates for handling, to a result estimated with respect to the error event using the model;
   in a case where each of the plurality of candidates for handling the error event is found by the comparing to be different from the estimated result, obtaining partial operation information from the history; and
   executing machine relearning based on the obtained partial operation information with respect to a layer in a latter stage in a plurality of layers included in the model, each performing a different estimation.

8. A non-transitory computer readable storage medium on which is stored a computer program for causing a computer to execute a method for a system that stores a model for estimating an appropriate handling for an error event detected in a network device, the model constructed by machine learning using operation information collected from the network device and a history of handlings for the network device, the method comprising:
   obtaining, based on an error event detected in the network device, a diagnosis result of diagnosis in the network device for identifying handling to be performed on the error event;
   in a case where the diagnosis result indicates a plurality of candidates for handling to be performed on the error event, comparing each of the plurality of candidates for handling, to a result estimated with respect to the error event using the model;
   in a case where each of the plurality of candidates for handling the error event is found by the comparing to be different from the estimated result, obtaining partial operation information from the history; and
   executing machine relearning based on the obtained partial operation information with respect to a layer in a latter stage in a plurality of layers included in the model, each performing a different estimation.

* * * * *